Aug. 28, 1962 L. E. BERND 3,050,898
AUTOMATIC LINE RELEASE MEANS
Filed Sept. 5, 1961
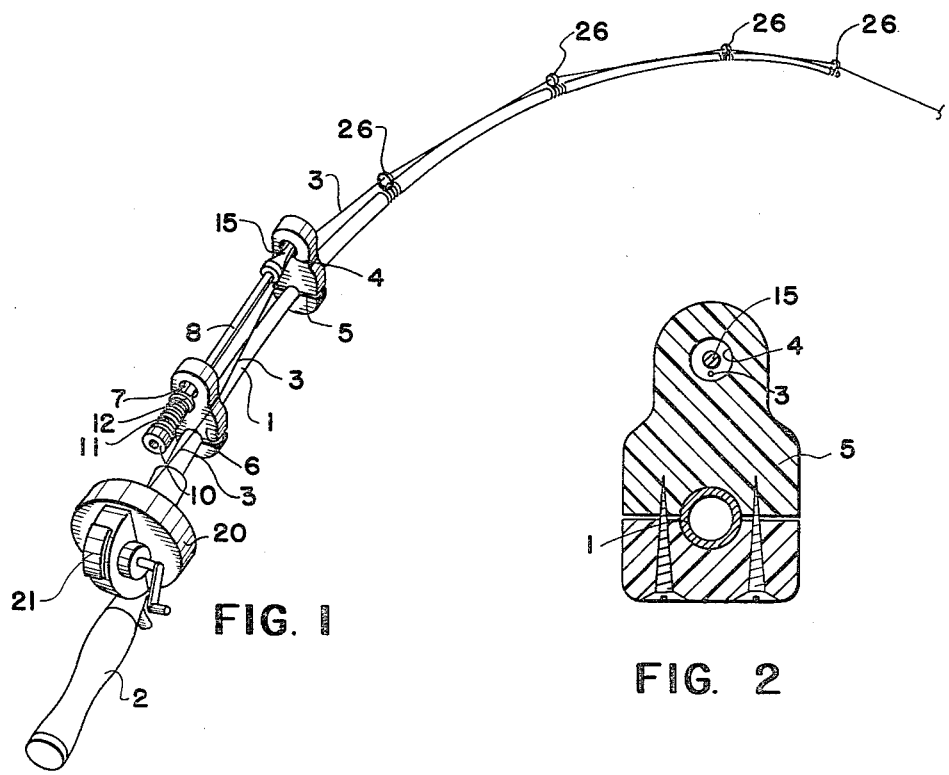
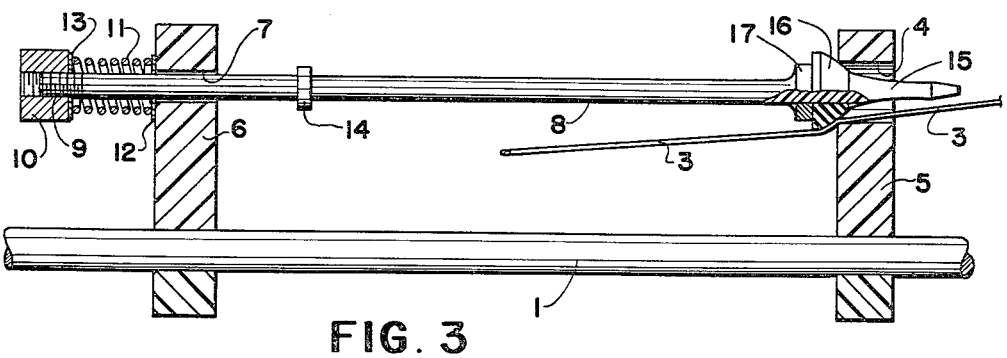
INVENTOR.
LOUIS E. BERND
BY John H. Widdowson
ATTORNEY

United States Patent Office 3,050,898
Patented Aug. 28, 1962

3,050,898
AUTOMATIC LINE RELEASE MEANS
Louis E. Bernd, 1211 E. Kansas, McPherson, Kans.
Filed Sept. 5, 1961, Ser. No. 136,018
6 Claims. (Cl. 43—25)

This invention relates to release means for lines and the like. More specifically, my invention relates to a remarkable new automatic line release which is particularly well adapted for use on flexible fishing rods. In a yet more specific aspect, my invention relates to a new line release mechanism, mountable on the flexible portion of a fishing rod, through which a fishing line is threaded, and which holds the line stationary relative thereto during the first part of a cast, and releases the line at the proper moment during said cast, the release being activated by the flexure of the flexible fishing rod.

At the present time, fishing rods, equipped usually with fishing reels, for example with a so-called spinning reel, are employed in an operation known as casting the bait. If a spinning reel is used, it is used with its brake off, while the line is running off the reel and out along the rod. Heretofore, it has been necessary when casting with a spinning reel, for the fisherman to hold the brake operator of the reel with his finger, releasing the brake at the proper time during the cast. If the line was released from the brake too soon, the bait would go high and would fall short of its mark. If the line was released too late, the bait would travel down, and again would fall short of its mark. The moment of release of the line is very critical. The casting operation is thus very difficult, particularly for beginning fishermen. There is also the additional hazard that, if the line is not released at the right moment and in the right manner, injury may occur to the fisherman or persons near him.

My invention is directed to a release means. The release means preferably includes a clamp means which is mountable on flexible means. Means are provided which are operably connectable to the clamp means and which cooperate with the clamp means, when mounted therein, to hold a line or the like stationary relative to itself and to release the line upon movement of the clamp means.

More specifically, my automatic fishing line release means includes a common fishing rod, with a handle, a flexible tip portion, and eyelets on the tip portion. Adjustably mounted on the flexible portion of the rod are two spaced clamps, each of which have an outwardly projecting portion generally in line with the eyelets. These clamps move relative to each other upon the flexing of the rod. A hole is provided in each of the projecting portions of the clamps and the axes of the holes are normally coaxial and are substantially parallel to the axis of the rod. My new invention also includes a shaft which is mounted on the clamps, the shaft having a rear portion which passes through the hole in the rear clamp, and a forward portion which is tapered to a point. The enlarged portion of the shaft has a rubber or resilient gasket therearound, and the enlarged portion is of such size that it can pass only partially through the hole in the front clamp. The shaft is wedgeable within the front clamp. The shaft extends beyond the rear clamp and is preferably threaded in its rear portion. A helical spring is positioned surrounding the shaft to the rear of the rear clamp and abutting the rear clamp. A nut is threadedly mounted on the shaft to engage and retain the spring. By adjusting the nut it is possible to adjust the compression of the spring. A stop is provided on the shaft and positioned in front of the rear clamp, and it serves to prevent the front or tapered part of the shaft from being moved out of the hole in the front clamp. The stop is in contact with the rear clamp when the shaft is in its most rearward position, and when the shaft is in such a position the spring is relatively loose between the nut and the rear clamp. When the shaft is in its forward position, the spring is under compression, the amount of which can be adjusted by adjusting the nut, and the rubber gasket is wedged tight within the rear portion of the hole in the front clamp. My invention is preferably used with a fishing reel mounted on the handle of the rod and a length of fishing line is secured to the reel and has a portion passing through the hole in the front clamp, then through the eyelets of the rod. If the reel is mounted on the same side of the rod as are the clamps, then the line can be passed through a small hole drilled in the rear clamp, if desired. My new invention operates as follows: When the shaft is pushed firmly forward by pushing on the nut or rear portion of the shaft, the enlarged portion of the shaft is wedged tight within the hole in the front clamp and the line is held tightly between the rubber gasket and the wall of the hole in the front clamp. When the rod is flexed during casting, the clamps are separated relative to each other, and the increased compression on the spring results in an increased force which pulls the shaft out of its wedged position in the front clamp, releasing the line and allowing it to move through the eyelets.

My invention is a great improvement over the prior art, in that it is no longer necessary to combine the casting motion with the manual release of the line. My invention releases the line automatically, and the moment of release is adjustable by changing the compression of the spring. With my new invention, amateur fishermen can be much more successful with their casts, and the possibility of injury to the user is eliminated.

It is an object of this invention to provide new line releasing means.

Another object of this invention is to provide new means for automatically releasing a line upon the flexing of a flexible means.

It is another object of my invention to provide new means for automatically releasing a line upon the flexing of a flexible means, the line releasing means being operable to hold the line stationary by wedging the line against a line receiving means positionable on the flexible means, and being movable relative to the line receiving means upon flexing of said flexible means to release the line.

It is yet another object of this invention to provide automatic line release means adjustably positionable and mountable by clamps on the flexible part of a fishing rod, and having spring loaded means constructed so that a fishing line is tightly held when the releasing means is loaded and the releasing means is released by the flexing of the rod during the cast, to release the fishing line automatically.

It is yet another object of my invention to provide an automatic fishing means on a fishing rod having a flexible tip portion, a handle therefor, a spinning reel and line mounted thereon, clamp means fastened to the rod, and a spring-loaded shaft mounted by the clamp means, with the spring-loaded shaft and clamp means being positioned so that when the shaft is in its loaded position the fishing line is held tightly, and when the tip end portion of the rod is flexed during casting the line will be released automatically and permitted to move.

It is still another object of my new invention to overcome the difficulties and drawbacks of the prior art, specifically, the difficulty of having to release the line at precisely the right moment during the cast, and the possibility of injury if the casting operation is not performed properly.

Other objects and advantages will be apparent and suggest themselves to those acquainted with the prior art upon reading this disclosure.

In further describing the invention, reference will be made to the accompanying drawings depicting a preferred specific embodiment of my invention, in which:

FIG. 1 is a perspective view of a fishing rod with the automatic line release means mounted thereon, just after the line has been automatically released by a cast.

FIG. 2 is a cross sectional view cut through the middle of the forward clamp of FIG. 1, and viewed from the direction of the handle, showing the line being held stationary.

FIG. 3 is a side view partly in cross section and partly cut away of the automatic line release means of FIG. 1, the release means being in its forward position, wedged into the hole of the front clamp, and holding the line stationary.

Following is a discussion and description of the new release means structure of my invention made with reference to the drawings whereon the same reference numerals are used to indicate the same or similar parts and/or structure. The discussion and description are of preferred specific embodiments of the new release means structure of my invention, and it is to be understood that such is not to unduly limit the scope of my invention.

In the preferred form of the invention as shown, rod 1 is the flexible portion of the fishing rod, made of a material such as plastic or wood, and 2 indicates the usual rigid handle portion. Fishing line 3 is wound first around a common reel 20 and is then threaded through hole 4 in front clamp 5. The invention can be used with any suitable common fishing reel, but is preferably used with a spinning reel like or similar to 20 having the usual line brake means 21. The fishing line 3 is then threaded through eyelets 26, of which there is usually two or more, thence to the bait, not shown. Positioned on said flexible rod 1 are aforesaid front clamp 5 and a rear clamp 6, made out of a material such as molded plastic or machined metal, mounted on the rod by means of screws which hold together the two pieces of each clamp and the rod running between the two pieces, each clamp having holes which are normally coaxial. Through the hole 7 in the rear clamp 6 passes a shaft 8, also made of a material such as plastic or wood, which is threaded at its rear extremity 9, and equipped thereon with nut 10. This shaft is slidably mounted through the hole in the rear clamp, and its front section rests in the hole of the front clamp. Located around shaft 8 and between nut 10 and rear clamp 6 is a spiral spring 11 protected on both ends by washers 12 and 13. Mounted on shaft 8 in front of rear clamp 6 is shaft flange or shaft stop 14. Shaft 8 is tapered at its front end 15, and is fitted with a rubber gasket 16 backed by a metal ring 17. Both the ring and the gasket are suitably secured to shaft 8 such as by gluing. The length of shaft 8, the position along the shaft of stop 14, and the length and strength of spiral spring 11 are such that when shaft 8 is in its forward position, as in FIGS. 2 and 3, spring 11 is under compression between nut 10 and rear clamp 6, and rubber gasket 16 is tightly wedged against the rear wall of hole 4, and fishing line 3 is tightly held between gasket 16 and the rear wall of hole 4. The length of shaft 8, the position along the shaft of stop 14, and the length of spiral spring 11 are such that when shaft 8 is in its most rearward position, as shown in FIG. 1, the point of taper 15 still remains inside hole 4, shaft stop 14 is adjacent the front wall of rear clamp 6, and spiral spring 11 is not under compression. An obvious modification of the above would be to have the gasket secured to the hole and to taper the hole rather than the shaft.

The action of the release device is as follows: Shaft 8 is wedged into hole 4 by manually pushing nut 10. This operation causes said fishing line 3 to remain stationary relative to shaft 8, to clamp 5, and to fishing rod 1. When fishing rod 1 flexes convex relative to shaft 8 which occurs during the latter part of or near the peak of the casting operation, clamps 5 and 6, having been clamped to rod 1 so as to remain perpendicular to that portion of the rod to which they each are clamped respectively, are moved farther apart from one another. Because the front of shaft 8 is wedgeably connected to clamp 5, the compression on spring 11 is increased. The increased force exerted by spring 11 upon this increased compression is sufficient to dislodge shaft 8 from its wedged position inside hole 4, releasing fishing line 3 and allowing it to pay out through eyelets 26 to its destination. The amount of compression on the spring when the shaft is wedged can be varied by turning the nut. My invention can thus be adjusted for the particular cast of an individual.

While certain specific embodiments of an improved casting rod have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An automatic fishing line release means comprising, in combination, an elongated fishing rod having a handle portion at the rear portion thereof and a flexible tip portion at the forward portion thereof, a plurality of aligned eyelets secured to said tip portion in spaced relation, two spaced clamps adjustably mounted on said rod to move therewith upon flexing of said rod, each of said clamps having an outwardly projecting portion generally in line with said eyelets, each of said projecting portions having a hole therethrough the axes of which are normally coaxial and which are substantially parallel to the axis of said rod, a shaft mounted on said clamps and having a rear portion passing through said hole in the rear one of said clamps, said shaft having a forward portion tapered inwardly from a relatively sharp point to an enlarged portion, a rubber gasket around said enlarged portion of said forward portion of said shaft, said gasket and said enlarged portion of said shaft being of such size that said shaft can pass only partially through said hole in said front clamp, and said shaft being wedgeable within said front clamp, projecting beyond said rear clamp and threaded in its rear portion, a helical spring mounted surrounding said shaft to the rear of said rear one of said clamps, a nut adjustably mounted on said rear portion of said shaft and retaining said spring thereon, a stop on said shaft in front of said rear one of said clamps, said stop contacting said rear one of said clamps when said shaft is in its most rearward position with said spring not in compression between said nut and said rear one of said clamps and with said forward portion of said shaft within said hole of said front clamp, and when said shaft is in its forward position said spring being in compression and said rubber gasket being wedged tight within the rear edge of said hole of said front clamp, a fishing reel mounted on said handle portion of said rod, a brake and brake button equipping said reel and automatically releasable by releasing said brake button, and a length of fishing line secured to said reel and having a portion thereof passing through said hole in said front clamp and through said eyelets in said rod, said automatic releasing means being constructed and adapted so that when said enlarged portion of said shaft is wedged tight within said hole in said front clamp, said line is held tightly between said rubber gasket on said shaft and said wall of said hole of said front clamp and so that when said tip end portion of said rod is flexed during casting said clamps are separated farther from each other, with the resulting force from increased compression of said spring pulling said shaft out of wedged position, and said line being released to move through said eyelets.

2. Automatic line releasing means comprising, in combination, a fishing rod having a handle portion at the rear end thereof and a flexible tip portion at the forward end thereof, two clamps adjustably mounted on said rod, each of said clamps having an outwardly projecting portion with a hole therethrough, a shaft mounted on said clamps and having a rear portion passing through said hole in the rear one of said clamps and having a front portion inwardly tapered, an elastic gasket of high frictional coefficient around said front portion of said shaft, said front portion of said shaft and said hole of said front clamp being of such relative size that said shaft can pass only partially through said hole in said front clamp, a spring mounted surrounding said rear portion of said shaft behind said rear clamp, a nut on said shaft retaining said spring thereon, a shaft stop mounted on said shaft in front of said rear clamp, said shaft stop being so positioned that when said shaft is in its most rearward position said shaft stop is in contact with said rear clamp and the point of said front end of said shaft remains inside said hole of said front clamp, and said spring being in such a position that when said shaft is in its most forward portion and is wedged against the wall of said hole of said front clamp said spring is partially compressed, a fishing reel mounted on said handle portion of said rod, and a length of fishing line having a portion thereof passing through said hole in said front clamp, said releasing means being constructed and adapted so that when said shaft is wedged against said front clamp said line is held tightly between said gasket on said shaft and said wall of said hole of said front clamp so that when said tip end portion of said rod is flexed away from said clamps during casting said clamps are separated relative to each other, and the resulting force from the increased compression on said spring will move said shaft out of its wedged position, and said line will be released and permitted to move.

3. Release means for a line comprising, in combination, line receiving means adjustably mountable on flexible means, wedgeable means operable with said line receiving means when mounted therewith to removably hold a line or the like stationary relative thereto by being wedged against said line receiving means, said wedgeable means movable relative to said line receiving means upon movement of said line receiving means to release said line.

4. Automatic line release means comprising, in combination, two clamps positionable on the flexible portion of a fishing rod, each of said clamps having a hole therethrough, a shaft passing through said hole in the rear one of said clamps and having the front end portion tapered to a point and wedgeable into said hole in the front one of said clamps, and a spring attached to said shaft behind said rear clamp and compressible against said rear clamp to urge said shaft rearwardly, said automatic line release means being constructed so that a fishing line threaded through said hole of said front clamp is tightly held when said shaft is wedged in said hole in said front clamp, and said shaft is removed from wedging engagement with said front clamp by said spring upon the flexing of the rod during the latter part of a cast to release the line.

5. Automatic line release means comprising, in combination, two clamp means adjustably mountable on the flexible portion of a fishing rod, each of said clamp means having a hole therethrough, a shaft passing through said hole in the rear one of said clamp means and having a front end portion shaped to be wedgeable in said hole in the front one of said clamp means, and spring means positioned on said shaft and engagable with said rear one of said clamp means to urge said front end portion of said shaft out of wedging engagement with said hole in said front clamp means, said automatic release means being constructed so that a line threaded through said front clamp means is tightly held when said front end portion of said shaft is wedged in said hole in said front clamp means and said shaft is removed from wedging engagement with said front clamp means by said spring during the flexing of the rod to thereby release said line.

6. Release means for a line or the like comprising, in combination, clamp means having passageways therethrough and mountable on flexible rod means or the like so that said passageways are separated during flexing of said rod means, shaft means slideably mounted in one of said passageways and wedgeably positionable in another of said passageways when said clamp means are mounted on said rod means, and resilient means with said shaft means and said clamp means to urge said shaft out of engagement with said another of said passageways to release a line or the like passing therethrough.

References Cited in the file of this patent

UNITED STATES PATENTS

| | | |
|---|---|---|
| 2,559,223 | Murray | July 3, 1951 |
| 2,810,982 | Bucciarelli | Oct. 29, 1957 |
| 2,843,963 | Butehorn | July 22, 1958 |